United States Patent
Kim et al.

(10) Patent No.: US 11,232,200 B2
(45) Date of Patent: Jan. 25, 2022

(54) APPARATUS FOR SELECTING REPRESENTATIVE TOKEN FROM DETECTION NAMES OF MULTIPLE VACCINES, METHOD THEREFOR, AND COMPUTER READABLE RECORDING MEDIUM STORING PROGRAM FOR PERFORMING THE METHOD

(71) Applicant: ESTsecurity Corp., Seoul (KR)

(72) Inventors: Sang Won Kim, Seoul (KR); Eui Tak Kim, Yongin-si (KR); Wook Hyun Jung, Siheung-si (KR)

(73) Assignee: ESTSECURITY CORP., Seoul (KR)

( * ) Notice: Subject to any disclaimer, the term of this patent is extended or adjusted under 35 U.S.C. 154(b) by 0 days.

(21) Appl. No.: 17/329,769

(22) Filed: May 25, 2021

(65) Prior Publication Data
US 2021/0406373 A1 Dec. 30, 2021

(30) Foreign Application Priority Data

Jun. 26, 2020 (KR) .......................... 10-2020-0078570

(51) Int. Cl.
*G06F 21/56* (2013.01)
*G06F 16/901* (2019.01)

(52) U.S. Cl.
CPC ........ *G06F 21/565* (2013.01); *G06F 16/9024* (2019.01); *G06F 21/568* (2013.01); *G06F 2221/034* (2013.01)

(58) Field of Classification Search
USPC ......................................................... 726/23
See application file for complete search history.

(56) References Cited

U.S. PATENT DOCUMENTS

| 10,649,970 | B1 * | 5/2020 | Saxe | ................. G06F 16/24558 |
| 2013/0014020 | A1 * | 1/2013 | Dixon | ..................... G06F 21/44 715/738 |
| 2017/0142140 | A1 * | 5/2017 | Muddu | ............... H04L 63/1441 |

FOREIGN PATENT DOCUMENTS

| JP | 6113740 B2 * | 4/2017 | .......... G06F 16/285 |
| KR | 2019-0024400 A | 3/2019 | |

OTHER PUBLICATIONS

Hurier, Mederic et al., "Euphony: Harmonious Unification of Cacophonous Anti-Virus Vendor Labels for Android Malware", 2017 IEEE/ACM 14th International Conference on Mining Software Repositories (MSR), 2017.

* cited by examiner

*Primary Examiner* — Sakinah White Taylor
(74) *Attorney, Agent, or Firm* — Novick, Kim & Lee, PLLC; Jae Youn Kim

(57) ABSTRACT

An apparatus for selecting a representative token of the present invention includes a token graph generation unit configured to extract a plurality of tokens from a plurality of detection names for malicious files and generate a detection name token graph representing a relationship between the extracted plurality of tokens, and a representative token selection unit configured to select a representative detection name token for the input file based on the detection name token graph.

10 Claims, 5 Drawing Sheets

APPARATUS FOR SELECTING REPRESENTATIVE TOKEN FROM DETECTION NAMES OF MULTIPLE VACCINES, METHOD THEREFOR, AND COMPUTER READABLE RECORDING MEDIUM STORING PROGRAM FOR PERFORMING THE METHOD

RELATED APPLICATIONS

This application claims priority to Korean Patent Application No. 10-2020-0078570, filed on Jun. 26, 2020 in the Korean Intellectual Property Office, the entire disclosure of which is incorporated herein by reference.

This application is based on an invention resulted from a Korea National R&D project supported by the South Korean government. The project information is as follows:

Assignment Identification Number: 1711103174;
Assignment Number: 2019-0-00026-002;
Government Department Name: Ministry of Science and ICT;
Name of Project Management Organization: Institute of Information & Communications Technology Planning & Evaluation;
Research Project Name: 2019 Information and Communication, Broadcasting R&D and Standard Development Support Project;
Research Assignment Name: ICT Infrastructure Protection from Advanced Malware Threats
Contribution Rate: 1/1;
Name of the Organization Performing the Project: EST-security Corp; and
Research Period: 2019.04.01~2022.12.31.

BACKGROUND OF THE INVENTION

1. Field of the Invention

The present invention relates to a technique for selecting a representative token, and more particularly, to an apparatus for selecting a representative token from detection names of multiple vaccines for malicious files, a method therefor, and a computer readable recording medium in which a program for performing the method is recorded.

2. Description of the Related Art

A single vaccine detection engine may be used to inspect whether or not any file, URL, etc. is malignant. When an input file is malignant, if the detection engine does not have a signature, etc. capable of detecting a malicious file, detection thereof will not be possible, which leads to infection of the corresponding system. To prevent this, inspecting the system through multiple antivirus software may significantly reduce the risk of non-detection. There are many online services using the same.

The existing vaccine detection engine only distinguishes whether the input file is normal or malignant through multiple vaccines, but does not provide information on the type or name of malicious code. To overcome this problem, the AVClass paper [Sebastian, Marcos, et al. "Avclass: A tool for massive malware labeling." International Symposium on Research in Attacks, Intrusions, and Defenses. Springer, Cham, 2016.] presents an idea of selecting tokens that commonly appear in vaccine detection names when using a manually created alias table to match different vaccine detection names and inputting one file. However, it could be confirmed that, when the alias table is not updated for a long time or there is no token that commonly appears in the detection names, a significant degradation in performance occurs.

For example, Korean Patent Laid-Open Publication No. 2019-0024400 published on Mar. 8, 2019 (Title: Object recognition apparatus and control method thereof) is a prior art reference.

SUMMARY OF THE INVENTION

It is an object of the present invention to provide an apparatus for selecting a representative token among multiple vaccine diagnosis names capable of first selecting a malware token or name which is used relatively more frequently among a plurality of different detection names without an alias table, a method for the same, and a computer readable recording medium in which a program for performing the method is recorded.

To achieve the above-described object, according to an aspect of the present invention, there is provided an apparatus for selecting a representative token, including: a token graph generation unit configured to extract a plurality of tokens from a plurality of detection names for malicious files and generate a detection name token graph representing a relationship between the extracted plurality of tokens; and a representative token selection unit configured to select a representative detection name token for the input file based on the detection name token graph.

The token graph generation unit may include: a detection name collection unit configured to collect a plurality of detection names of a plurality of different vaccine engines for malicious files; a detection name tokenization unit configured to tokenize each of the plurality of detection names to generate a plurality of tokens; and a graph generation unit configured to generate a complete graph based on the plurality of tokens divided by tokenization.

The graph generation unit may generate a complete graph which uses each of the plurality of tokens as nodes and connects the nodes with the edges which represent the relationship therebetween as a conditional probability.

The token graph generation unit may further include a graph reduction unit configured to derive a relationship between the nodes according to the conditional probability, and when the relationship between the derived nodes has weak or no relationship, delete an edge between the nodes which have weak or no relationship to reduce the complete graph, thus to generate a detection name token graph.

The representative token selection unit may include: a detection name input unit configured to receive a plurality of different detection names of one input file from a plurality of vaccine servers; a detection name preprocessing unit configured to extract a plurality of tokens by tokenizing each of the plurality of different detection names of the input file; and a token selection unit configured to select a representative detection name token among the plurality of extracted tokens based on the detection name token graph.

The token selection unit may calculate a common index which represents a frequency in which the token is used in common in the plurality of vaccine engines based on an attribute of the node of the detection name token graph, and an importance index which represents an importance of the token among entire tokens, select at least one index of the common index and the importance index as a reference and sorts the extracted plurality of tokens in the order of the highest index selected as the reference, designate tokens to be analyzed one by one in the sorted order, and if there is a token whose number of subsets for the next order token of the token designated as the token to be analyzed is less than a predetermined value, select the designated token as the representative detection name token with reference to the relationship between the plurality of nodes from the detection name token graph.

According to another aspect of the present invention, there is provided a method for selecting a representative token, including: extracting, by a token graph generation unit, a plurality of tokens from a plurality of detection names for malicious files, and generating a detection name token graph representing a relationship between the extracted plurality of tokens; and selecting, by a representative token selection unit, a representative detection name token for the input file based on the detection name token graph.

The step of generating the detection name token graph may include: collecting, by a detection name collection unit, a plurality of detection names of a plurality of different vaccine engines for malicious files; tokenizing, by a detection name tokenization unit, each of the plurality of detection names to generate a plurality of tokens; and generating, by a graph generation unit, a complete graph based on the plurality of tokens divided by tokenization.

The step of generating the complete graph may include generating, by the graph generation unit, a complete graph which uses each of the plurality of tokens as nodes and connects the nodes with the edges which represent the relationship therebetween as a conditional probability.

After the step of generating the complete graph, the method may further include: deriving, by a graph reduction unit, a relationship between the nodes according to the conditional probability; and when the relationship between the derived nodes has weak or no relationship, deleting, by the graph reduction unit, an edge between the nodes which have weak or no relationship to reduce the complete graph, thus to generate a detection name token graph.

The step of selecting the representative detection name token may include: receiving, by a detection name input unit, a plurality of different detection names of one input file from a plurality of vaccine servers; extracting, by a detection name preprocessing unit, a plurality of tokens by tokenizing each of the plurality of different detection names of the input file; and selecting, by a token selection unit, a representative detection name token among the plurality of extracted tokens based on the detection name token graph.

The step of selecting the representative detection name token may include: calculating, by the token selection unit, a common index which represents a frequency in which the token is used in common in the plurality of vaccine engines based on an attribute of the node of the detection name token graph, and an importance index which represents an importance of the token among entire tokens; selecting, by the token selection unit, at least one index of the common index and the importance index as a reference and sorts the extracted plurality of tokens in the order of the highest index selected as the reference; designating, by the token selection unit, the plurality of tokens as the token to be analyzed one by one in the sorted order; and making an inquiry, by the token selection unit, the number of nodes having a subset relationship for the next order token of the token designated in the detection name token graph, and if the number of inquired nodes having the subset relationship is less than a predetermined value, selecting the designated token as the representative detection name token.

According to another aspect of the present invention, there is provided a computer readable recording medium in which a program for performing the method for selecting a representative token according to any one of claims 7 to 12 on a computer is recorded.

According to the present invention, a word that can better represent the sample group than a general or specific detection name may be selected as a representative detection name token by identifying the subset relationship between the tokens. In addition, the present invention allows to detect tokens that are used throughout between vaccines based on the common index, thus to find a word that is widely used as the representative detection name token. Further, the present invention allows to derive a token that is more frequently used between samples based on the importance index, thus to select a word that represents a more malicious code group as the representative detection name token.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
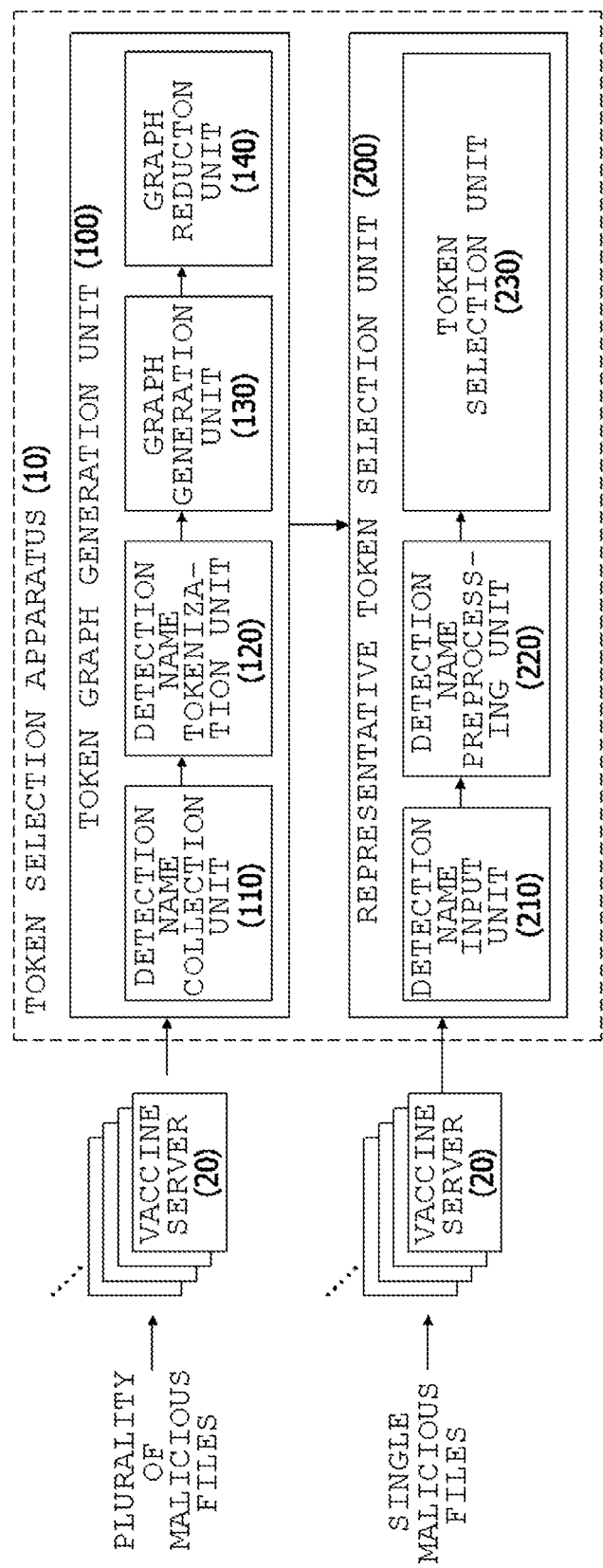
FIG. 1 is a diagram for describing a configuration of an apparatus for selecting a representative token among multiple vaccine diagnosis names according to an embodiment of the present invention.

Terms or words used herein should not be construed as limited to a conventional or lexical meaning, and should be understood as appropriate notions by the inventor based on that he/she is able to define terms to describe his/her invention in the best way to be seen by others. Therefore, embodiments described herein and configurations illustrated in the drawings are the most preferable embodiment of the present invention and not exhaustive in terms of the technical idea of the present invention, and it will be understood that various modifications and equivalents may be made to take the place of the embodiments at the application point of the present invention.

Hereinafter, preferred embodiments of the present invention will be described in detail with reference to the accompanying drawings. Herein, it should be noted that the same components are denoted by the same reference numerals in the accompanying drawings. In addition, detailed descriptions of well-known functions and configurations that may make the subject matter of the present invention rather unclear will not be described. For the same reason, in the accompanying drawings, some components are exaggerated, omitted, or schematically illustrated, and the size of each component does not entirely reflect the actual size.

Figure 2:
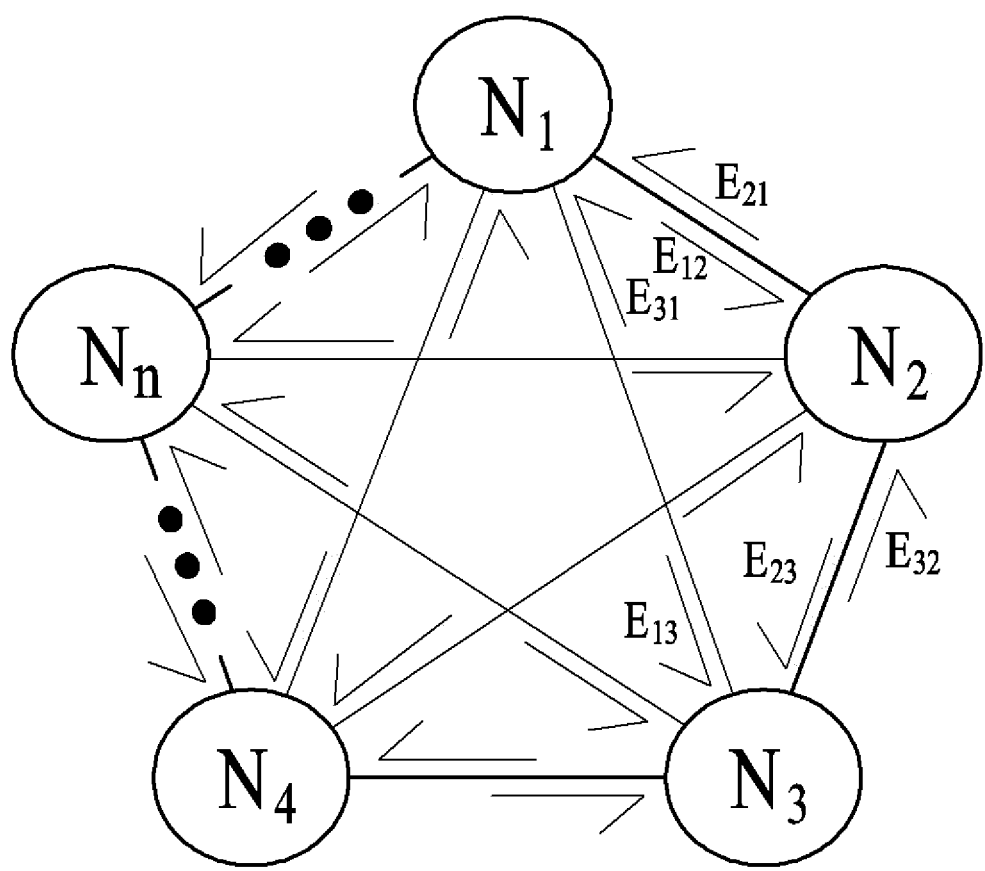
FIG. 2 is a diagram illustrating an example of a graph for selecting a representative token among multiple vaccine diagnosis names according to an embodiment of the present invention.

First, an apparatus for selecting a representative token among multiple vaccine diagnosis names according to an embodiment of the present invention will be described. FIG. 1 is a diagram for describing a configuration of an apparatus for selecting a representative token among multiple vaccine diagnosis names according to an embodiment of the present invention, and FIG. 2 is a diagram illustrating an example of a graph for selecting a representative token among multiple vaccine diagnosis names according to an embodiment of the present invention.

Referring to FIG. 1, the apparatus for selecting a representative token among multiple vaccine diagnosis names according to an embodiment of the present invention 10 (hereinafter, abbreviated as a 'token selection apparatus') includes a token graph generation unit 100 and a representative token selection unit 200.

The token graph generation unit 100 is configured to extract a plurality of tokens from a plurality of detection names for malicious files, and generate a detection name token graph representing a relationship between the plurality of extracted tokens. To this end, the token graph generation unit 100 includes a detection name collection unit 110, a detection name tokenization unit 120, a graph generation unit 130, and a graph reduction unit 140.

The detection name collection unit 110 may collect and store a plurality of detection names for a plurality of malicious files. A plurality of vaccine servers 20 operate different vaccine engines, and these multiple vaccine servers 20 use different detection names for the plurality of malicious files detected through different vaccine engines.

Table 1 below shows examples of detection names used by different vaccine engines for malicious files.

TABLE 1

| File sha256 | AlYac | Kaspersky | ... |
|---|---|---|---|
| 0123abcd... | Backdoor.Remcos.A | Backdoor.Win32.Remcos.neg | ... |
| abcd0123... | Backdoor.Phantom | Backdoor.Win32.Phantom.20.b | ... |
| ... | ... | ... | ... |

As shown in Table 1, a plurality of different vaccine engines (e.g., AlYac, Kaspersky) have different detection names ("Backdoor.Remcos.A," "Backdoor.Win32.Remcos.neg") for the same malicious file. Accordingly, the detection name collection unit 110 collects the plurality of different detection names for the plurality of malicious files from the plurality of vaccine servers 20, and stores the collected detection names together with file information of the malicious files.

The detection name tokenization unit 120 tokenizes each of the plurality of detection names collected by the detection name collection unit 110 and divides them into a plurality of tokens according to preset references. Table 2 below shows an example of tokens generated according to tokenization.

TABLE 2

| File sha256 | Token | ... |
|---|---|---|
| 0123abcd... | {"Backdoor", "Remcos", "Backdoor", "Win32", "Remcos"} | ... |
| abcd0123... | {"Backdoor", "Phantom", "Backdoor", "Win32", "Phantom"} | ... |
| ... | ... | ... |

The references for dividing the detection names into tokens are predefined, and various references may be set. One of these references may be words and numbers. As an example, tokens are classified into word units, and may include numbers. As another example, tokens are classified into word units, but may not include numbers. In addition, it is possible to establish a reference for a length of the token. For example, by setting a reference for minimum value of the token length, tokens whose length is too short may be excluded.

The examples of Table 2 are obtained by tokenizing the detection names shown in Table 1, which is a case in which the references are divided into word units and include numbers, and the minimum value of the token length is set to be 5. Accordingly, tokens {"Backdoor" and "Remcos"} were extracted from the detection name [Backdoor.Remcos.A] of the vaccine engine AlYac, and A did not satisfy the minimum value of the token length, and thus was excluded. In addition, tokens {"Backdoor," "Win32," "Remcos"} were extracted from the detection name [Backdoor.Win32.Remcos.neg] of the vaccine engine Kaspersky. In the case of the token "Win32," numbers are included in the word, and neg did not satisfy the minimum value of the token length, and thus was excluded.

The graph generation unit 130 generates a complete graph which uses each of the plurality of tokens generated by the detection name tokenization unit 120 as nodes. An example of the complete graph is shown in FIG. 2. As shown in FIG. 2, the complete graph includes a plurality of nodes N1, N2, N3, ... and Nn, and the plurality of nodes are connected with edges E12, E21, E23, E32, E31, and E13 ....

In the complete graph, the nodes are defined as tokens. That is, in the complete graph of FIG. 2, n tokens constitute n nodes N1, N2, N3, ... and Nn. Each node has properties including a token count (TC) and a file count (FC). The token count (TC) represents the number of tokens that have not been deduplicated. The file count (FC) represents the number of files (malicious files) in which the tokens are included. Table 3 below shows examples of node attribute values.

TABLE 3

| Node | TC: Token count | FC: File count |
|---|---|---|
| Backdoor | 153 | 100 |
| Remcos | 23 | 12 |
| Phantom | 6 | 3 |
| ... | ... | ... |

A common index (Co) is an index representing how commonly the token was used between the vaccine engines based on the token count TC and the file count FC, which are attributes of the node, and may be calculated through Equation 1 below.

$$Co_i = \frac{TC_i}{FC_i} \quad \text{[Equation 1]}$$

In Equation 1, Co represents the common index, TC represents the token count, and FC represents the file count. Further, i is an index representing each token.

An importance index (Im) is an index representing how high the importance of the token is based on the token count TC, which is an attribute of the node, and may be calculated through Equation 2 below.

$$Im_i = \frac{TC_i}{\sum_i TC_i} \qquad \text{[Equation 2]}$$

In Equation 2, Im is the importance index, TC represents the token count of the token, and "$\Sigma TC_i$" represents a sum of the token counts of entire tokens. Further, i is an index representing each token.

The complete graph includes edges having directions to other nodes which exist in each node thereof. For example, assuming that the complete graph of FIG. 2 consists only of a first node N1, a second node N2, and a third node N3, there are edges E12 and E21 mutually facing the first node N1 and the second node N2, edges E23 and E32 mutually facing the second node N2 and the third nodes N3, and edges E31 and E13 mutually facing the third node N3 and the first node N1. These edges have conditional probability as an attribute. For example, when nodes A and B exist, a conditional probability P(B|A) of the edge (A→B) in a direction from the node A to the node B is calculated according to Equation 3 below. Examples of the calculated conditional probabilities are shown in Table 4 below.

P(B|A)=Number of files with B token in file group with A token/Number of files with A token    [Equation 3]

TABLE 4

| Edge | | Conditional probability |
|---|---|---|
| prior | posterior | P(posteruir|prior) |
| Backdoor | Remcos | 0.11 |
| Remcos | Backdoor | 0.92 |
| Phantom | Remcos | 0.01 |
| Remcos | Phantom | 0.07 |
| ... | ... | ... |

As such, the graph generation unit 130 may generate a complete graph which uses each of the plurality of tokens as nodes and connects the nodes with the edges which represent the relationship therebetween as the conditional probability.

The graph reduction unit 140 reduces the complete graph by deleting the edges according to a degree of the relationship between the nodes according to the conditional probability to complete a detection name token graph. For example, when an error tolerance count a of the conditional probability is 0.1, the relationship between the nodes is derived from the calculated conditional probability according to the conditions shown in Table 5 below.

TABLE 5

| Condition | Relationship | Relationship definition |
|---|---|---|
| P(B|A) > 0.9 AND P(A|B) > 0.9 | A = B | A and B have the same relationship |
| P(B|A) < 0.1 AND P(A|B) < 0.1 | A ≠ B | No relationship (edge deleted) |
| P(B|A) < 0.9 AND P(A|B) > 0.9 | A ⊃ B | B is a subset relationship of A |
| P(B|A) > 0.9 AND P(A|B) < 0.9 | A ⊂ B | A is a subset relationship of B |
| Others | | Weak relationship (edge deleted) |

Examples of others in Table 4 may include {P(B|A)>0.9 OR P(A|B)>0.9}, {P(B|A)<0.1 OR P(A|B)<0.1}, {P(B|A)<0.9 OR P(A|B)>0.9}, {P(B|A)>0.9 OR P(A|B)<0.9}, etc. In these cases, it may be defined as a weak relationship.

As shown in Table 4, the derived relationships include 'same relationship', 'subset relationship', 'weak relationship', and 'no relationship'. The graph reduction unit 140 deletes edges between the nodes having weak or no relationship ('weak relationship' and 'no relationship') to reduce the complete graph. As such, the complete graph in which edges having weak or no relationship are deleted is referred to as a detection name token graph. In particular, as the conditional probability tolerance count a is smaller, the degree of the relationship is stricter, such that a more reduced complete graph, that is, a detection name token graph may be generated.

Table 6 below shows specific examples of deriving the relationship between the nodes according to the conditions shown in Table 5 from the calculated conditional probability, when error tolerance count a of the conditional probability is 0.1.

TABLE 6

| Edge | | Conditional probability | |
|---|---|---|---|
| prior | posterior | P(posteruir|prior) | Relationship |
| Backdoor | Remcos | 0.11 | Remcos ⊂ Backdoor |
| Remcos | Backdoor | 0.92 | |
| Phantom | Remcos | 0.01 | Phantom ≠ Remcos |
| Remcos | Phantom | 0.07 | |
| ... | ... | ... | ... |

According to the examples of Table 6, the relationship between Backdoor and Remcos is defined that Remcos is a subset of Backdoor, and it can be seen that Phantom and Remcos have no relationship with each other. In this case, the graph reduction unit 140 deletes the edge between Phantom and Remcos.

In FIG. 2, it is assumed that the first node N1 is token Backdoor, and the second node N2 is token Remcos. Each of the edges E12 and E21 between the first node N1 and the second node N2 is defined as E12=P(Backdoor|Remcos) and E21=P(Remcos|Backdoor) according to the conditional probability. When E12=0.11 and E21=0.92, the token Backdoor has a relationship that includes the token Remcos, that is, a subset relationship (Backdoor ⊃ Remcos).

In addition, it is assumed that the third node N3 is token Phantom. Each of the edges E23 and E32 between the second node N2 and the third node N3 is defined as E23=P(Phantom|Remcos) and E21=P(Remcos|Phantom) according to the conditional probability. When E23=0.01 and E32=0.07, it can be seen that Backdoor and Remcos have no relationship therebetween. Accordingly, the edges E23 and E32 between the second node N2 and the third node N3 are deleted.

When a plurality of detection names of a file to be analyzed are input, the representative token selection unit 200 selects a representative detection name token for the plurality of detection names of the input file based on the detection name token graph generated by the token graph generation unit 100. To this end, the representative token selection unit 200 includes a detection name input unit 210, a detection name preprocessing unit 220, and a token selection unit 230.

The detection name input unit 210 is configured to receive a plurality of detection names for any one file. The detection name input unit 210 receives a plurality of different detection names for one input file from the plurality of vaccine servers 20. The detection name input unit 210 may store the plurality of input detection names together with file information of the malicious file.

The detection name preprocessing unit 220 tokenizes each of the plurality of detection names for the input file received by the detection name input unit 210 according to the same references as the references of the detection name tokenization unit 120 to extract a plurality of tokens. This tokenization is performed in the same way as the detection name tokenization unit 120.

The token selection unit 230 selects a representative detection name token among the plurality of tokens extracted by the detection name preprocessing unit 220 based on the detection name token graph generated by the token graph generation unit 100. The token selection unit 230 selects a representative detection name token according to the following policy.

First, weights are given so that tokens commonly used in the plurality of vaccine engines are preferentially selected. This is because the more commonly used a token is in various vaccines, the more popular the token is. Second, if a token has a great importance among the entire tokens, a weight is given to the token so that it is preferentially selected. This is because the greater importance of the token, the more it represents the malicious code group. Third, it is set so that tokens used throughout are not selected by limiting the number of subsets. For example, Backdoor has a relationship that includes both Remcos and Phantom. Backdoor is bound to the detection name together with many other tokens, such that the number of subsets is inevitably large.

In order to apply the three policies as described above, the token selection unit 230 first, for each of the plurality of tokens extracted by the detection name preprocessing unit 220, calculates a common index Co and an importance index Im from the detection name token graph generated by the token graph generation unit 100. In addition, the token selection unit 230 selects at least one of the common index Co and the importance index Im as a reference, and sorts the extracted tokens in the order of the highest index selected as the reference.

According to an embodiment, the token selection unit 230 selects the common index Co as a senior reference index, and selects the importance index Im as a junior reference index. Then, the token selection unit 230 sorts the plurality of tokens in the order of the highest common index Co, which is the senior reference index. That is, the token selection unit 230 sorts the tokens in descending order of the common index Co. Then, there may be a plurality of tokens having the same common index Co among the plurality of tokens sorted in the order of the highest common index Co. In this case, the token selection unit 230 sorts the plurality of tokens, which have the same common index Co among the plurality of tokens sorted in the order of the highest common index Co, in the order of the highest importance index Im, which is the junior reference index. That is, the token selection unit 230 sorts the plurality of tokens, which have the same common index Co among the plurality of tokens sorted in descending order of the common index Co, in descending order of the importance index Im.

According to another embodiment, the token selection unit 230 may select any one index of the common index Co and the importance index Im as a reference index, and may sort the plurality of tokens according to the order in which the selected reference index is high.

According to another embodiment, the token selection unit 230 may select a sum of the common index Co and the importance index Im as a reference index, and may sort the plurality of tokens according to the order in which the selected reference index is high.

Then, the token selection unit 230 designates tokens to be analyzed one by one in the order in which the plurality of tokens are sorted. Subsequently, if there is a token whose number of subsets (subset relationships) for the next order token of the token designated as the token to be analyzed is less than a predetermined value, the token selection unit 230 selects the token currently designated as the token to be analyzed as the representative detection name token with reference to the relationship between the plurality of nodes from the detection name token graph. As a result, the token selection unit 230 selects a token having the highest at least one index of the common index Co and importance index Im, which are selected as the representative detection name token among the tokens whose number of subsets for the next order token is less than the predetermined value as the reference.

As described above, according to the present invention, it is possible to indicate what type of malicious code as well as a normal or malicious diagnosis in multiple vaccines in a single word, that is, a representative detection name token. For example, a popular name such as Remcos can be selected instead of a name that is too common (e.g., Trojan, Backdoor) or a code name that is too specific (e.g., AABAEE). The selected name may be used in data labeling, a first step in malware detection machine learning. When trying to classify the types of malicious code by machine learning, it is necessary to manually label each malicious code one by one through a method of searching for samples (e.g., SSDeep, imphash, etc.) similar to the diagnosis name of the vaccine engine or through manual analysis. However, when using the apparatus, the entire labeling process may be automatically processed. Even if a new malicious code having a new diagnosis name appears, automatic labeling with a new label is possible without manual intervention by simply updating the token graph.

In addition, detection names derived from the multiple vaccines may be summarized in a single word, that is, a token, and presented to a user or illustrated in a report. Existing solutions list detection names derived from all vaccine engines, but may be abbreviated in a single word to increase visibility. In addition, it is possible to increase the level of the report by linking related reports and articles through keyword search for malicious codes in connection with the portal sites.

Figure 3:
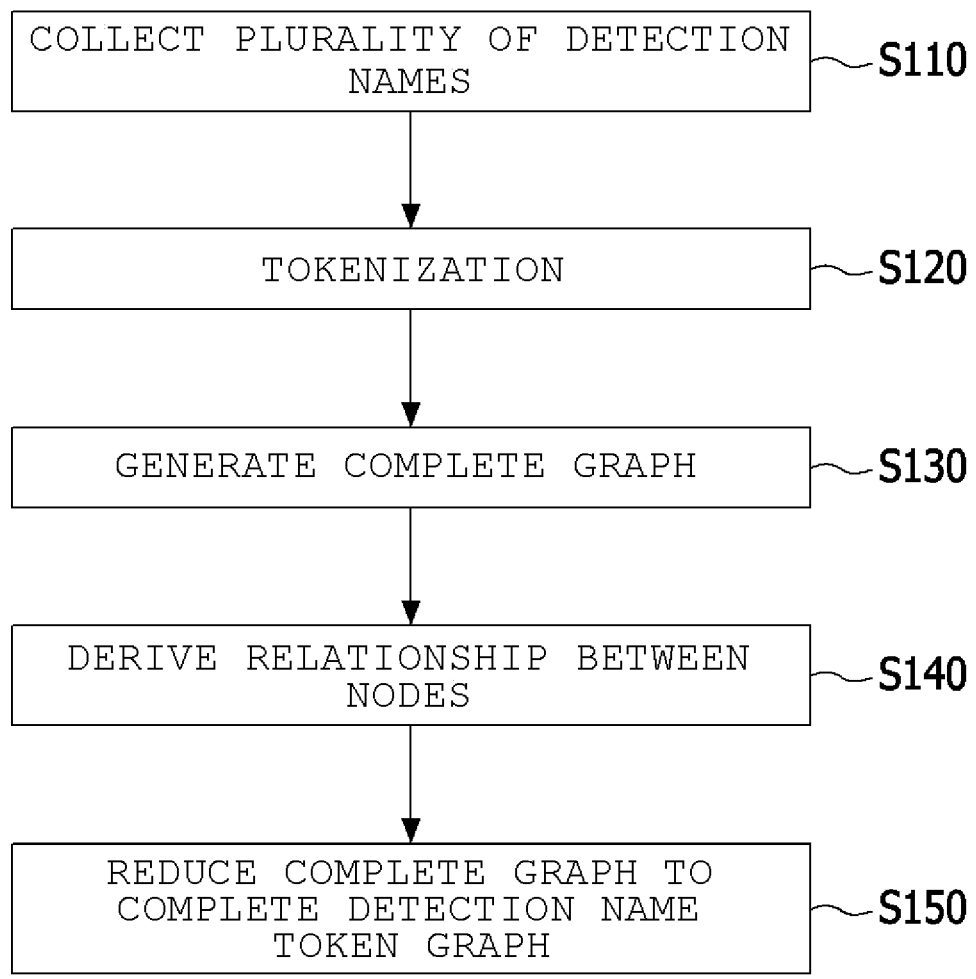
FIG. 3 is a flowchart illustrating a method of generating a graph for selecting a representative token from detection names of multiple vaccines according to an embodiment of the present invention.

Next, a method for selecting a representative token from the detection names of the multiple vaccines according to an embodiment of the present invention will be described. To select a representative token, the detection name token graph is required. Therefore, a method of generating the detection name token graph will be described first. FIG. 3 is a flowchart illustrating a method of generating a graph for selecting a representative token from detection names of multiple vaccines according to an embodiment of the present invention.

Referring to FIG. 3, the detection name collection unit 110 of the token graph generation unit 100 collects a plurality of different detection names for a plurality of malicious files from the plurality of vaccine servers 20 in step S110. The plurality of vaccine servers 20 include a plurality of different vaccine engines, and the plurality of different vaccine engines (e.g., AIYac, Kaspersky) have different detection names ("Backdoor.Remcos.A", "Backdoor.Win32.Remcos.neg") for the same malicious file (e.g., File sha256: 0123abcd).

Next, the detection name tokenization unit 120 of the token graph generation unit 100 tokenizes each of the plurality of detection names previously collected by the detection name collection unit 110 according to preset references as shown in Table 2 in step S120, and divides them into a plurality of tokens. The references for dividing into tokens may be set in advance. For example, when the tokens are divided into word units as a reference and include numbers, and the minimum value of the token length is set to be 5, then two tokens {"Backdoor", "Remcos"} are extracted from the detection name [Backdoor.Remcos.A] of the vaccine engine AlYac, and A is excluded because it does not satisfy the minimum value of the token length.

Next, the graph generation unit 130 of the token graph generation unit 100 generates a complete graph which uses each of the plurality of tokens generated by the detection name tokenization unit 120 as nodes in step S130. As shown in FIG. 2, the complete graph includes the plurality of nodes N1, N2, N3, . . . and Nn, and the plurality of nodes are connected with the edges E12, E21, E23, E32, E31, and E13 . . . . In the complete graph, the nodes are defined as tokens. That is, in the complete graph of FIG. 2, n tokens constitute n nodes N1, N2, N3, . . . and Nn. Each node includes the token count TCt representing the number of tokens that have not been deduplicated, and the file count FC representing the number of files (malicious files) in which the tokens are included as attributes. From the token count TC and the file count FC, which are attributes of the node (token), a common index Co representing how commonly the token was used among vaccine engines may be derived according to Equation 1. In addition, an importance index Im representing how high the importance of the token is based on the token count TC, which is an attribute of the node and may be calculated according to Equation 2. The complete graph includes edges having directions to other nodes which exist in each node thereof. This edge has a conditional probability calculated according to Equation 3 as an attribute. As such, the graph generation unit 130 may generate a complete graph which uses each of the plurality of tokens as nodes and connects the nodes with the edges which represent the relationship therebetween as the conditional probability.

Next, the graph reduction unit 140 of the token graph generation unit 100 derives the relationship between the nodes based on the edges derived through the conditional probability in step S140. The derived relationship may be divided into the same relationship, subset relationship, weak relationship, and no relationship. Then, the graph reduction unit 140 reduces the complete graph by deleting edges between the nodes having weak or no relationship except for the same relationship and the subset relationship in step S150. Thereby, the detection name token graph is completed. For example, again referring to FIG. 2, it is assumed that the first node N1 is token Backdoor, the second node N2 is token Remcos, and the third node N3 is token Phantom. Each of the edges E12 and E21 between the first node N1 and the second node N2 is defined as E12=P(Backdoor|Remcos), and E21=P(Remcos|Backdoor) according to the conditional probability. When E12=0.11 and E21=0.92, the token Backdoor has a relationship that includes the token Remcos, that is, a subset relationship (Backdoor ⊃ Remcos). In addition, each of the edges E23 and E32 between the second node N2 and the third node N3 is defined as E23=P(Phantom|Remcos) and E21=P(Remcos|Phantom) according to the conditional probability. When E23=0.01 and E32=0.07, it can be seen that Backdoor and Remcos have no relationship therebetween. Accordingly, the edges E23 and E32 between the second node N2 and the third node N3 are deleted.

Figure 4:
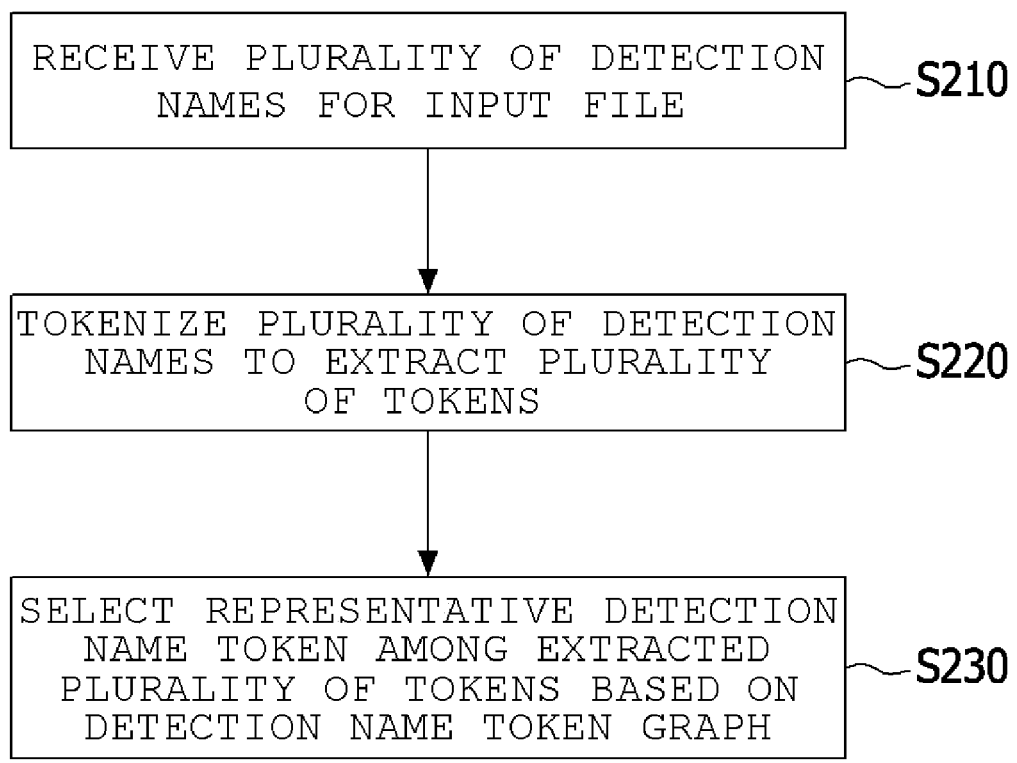
FIG. 4 is a flowchart for describing a method for selecting a representative token from the detection names of the multiple vaccines according to an embodiment of the present invention.
Figure 5:
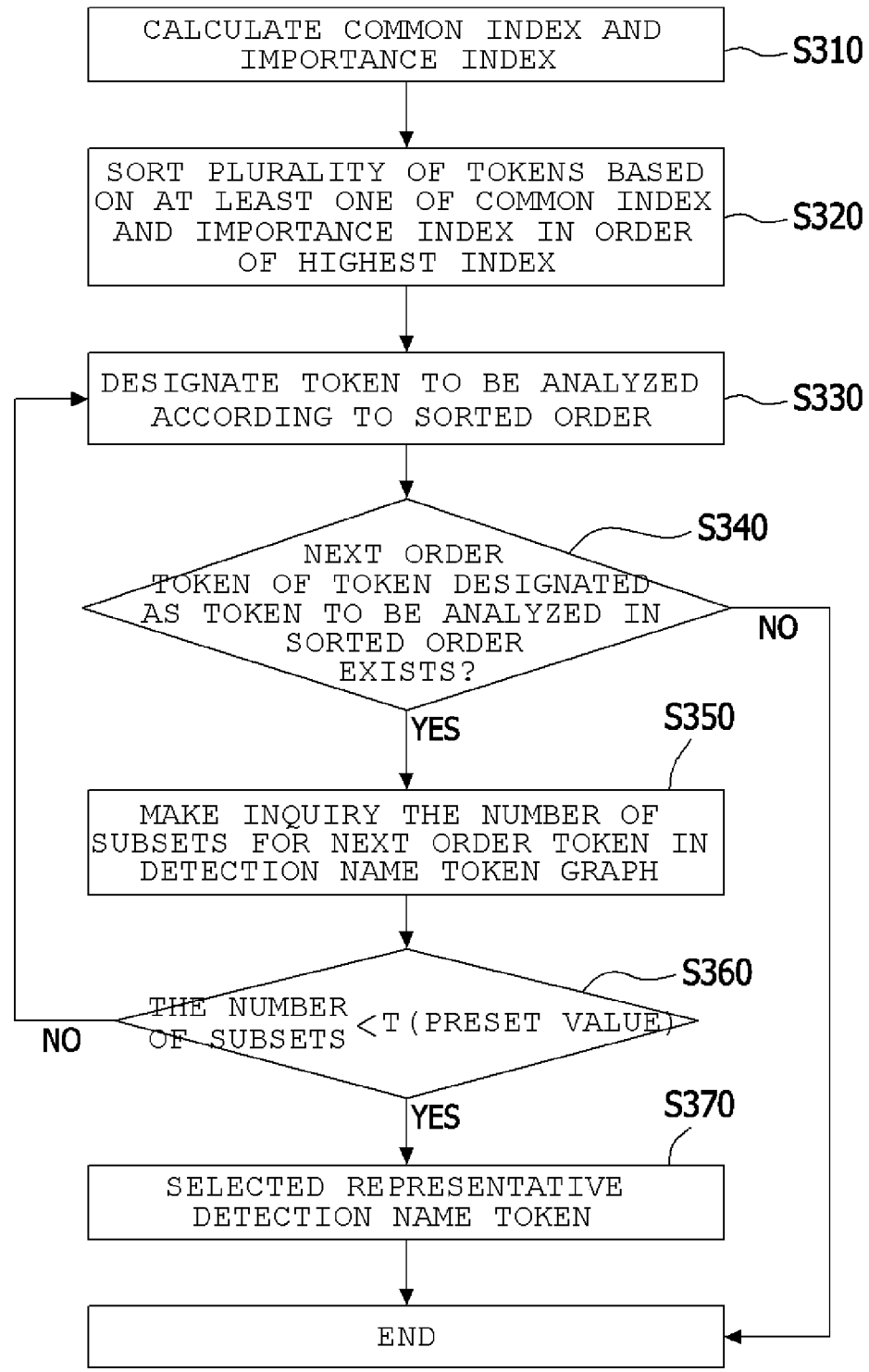
FIG. 5 is a flowchart for describing in more detail the method for selecting a representative token from the detection names of the multiple vaccines according to an embodiment of the present invention.

Next, a method for selecting a representative token from the detection names of the multiple vaccines according to an embodiment of the present invention will be described. FIG. 4 is a flowchart illustrating the method for selecting a representative token from the detection names of the multiple vaccines according to an embodiment of the present invention, and FIG. 5 is a flowchart for describing in more detail a method for selecting a representative token from the detection names of the multiple vaccines according to an embodiment of the present invention.

First, referring to FIG. 4, the detection name input unit 210 of the representative token selection unit 200 receives a plurality of different detection names for one input file from the plurality of vaccine servers 20 in step S210. Subsequently, the detection name preprocessing unit 220 of the representative token selection unit 200 tokenizes each of the plurality of detection names for the input file received by the detection name input unit 210 in step S220 according to the same references as the detection name tokenization unit 120 to extract a plurality of tokens.

Next, the token selection unit 230 of the representative token selection unit 200 selects a representative detection name token among the plurality of tokens extracted by the detection name preprocessing unit 220 based on the detection name token graph generated by the token graph generation unit 100 in step S230. The token selection unit 230 selects the representative detection name token according to the following policy.

First, weights are given so that tokens commonly used in the plurality of vaccine engines are preferentially selected. Second, if a token has a great importance among the entire tokens, a weight is given to the token so that it is preferentially selected. Third, it is set so that tokens used throughout are not selected by limiting the number of subsets. Then, step S230 of selecting the representative detection name token by reflecting this policy will be described in more detail.

Referring to FIG. 5, the token selection unit 230 calculates a common index Co and an importance index Im from the detection name token graph generated by the token graph generation unit 100 for each of the plurality of tokens extracted by the detection name preprocessing unit 220 in step S310. Then, the token selection unit 230 selects at least one index of the common index Co and the importance index Im, and sorts the plurality of tokens extracted by the detection name preprocessing unit 220 in the order of the highest index selected as the reference in step S320.

According to an embodiment of step S320, the token selection unit 230 selects the common index Co as a senior reference index, and selects the importance index Im as a junior reference index. Then, the token selection unit 230 sorts the plurality of tokens in the order of the highest common index Co, which is a senior reference index. That is, the token selection unit 230 sorts the tokens in descending order of the common index Co. Then, there may be a plurality of tokens having the same common index Co among the plurality of tokens sorted in the order of the highest common index Co. In this case, the token selection unit 230 sorts the plurality of tokens, which have the same common index Co among the plurality of tokens sorted in the order of the highest common index Co, in the order of the highest importance index Im, which is the junior reference index. That is, the token selection unit 230 sorts the plurality of tokens, which have the same common index Co among the plurality of tokens sorted in descending order of the common index Co, in descending order of the importance index Im.

According to another embodiment of step S320, the token selection unit 230 may select any one index of the common index Co and the importance index Im as a reference index, and may sort the plurality of tokens according to the order in which the selected reference index is high.

According to another embodiment of step S320, the token selection unit 230 may select a sum of the common index Co and the importance index Im as a reference index, and may sort the plurality of tokens according to the order in which the selected reference index is high.

Next, the token selection unit 230 designates each token as a token to be analyzed according to the sorted order of the plurality of tokens in step S330. Subsequently, the token selection unit 230 determines whether the next order token of the token designated as the token to be analyzed exists in the sorted order of the plurality of tokens in step S340. As a result of the determination in step S340, if the next order token does not exist, the process ends. On the other hand, as a result of the determination in step S340, if the next order token exists, the token selection unit 230 makes an inquiry the number of subsets for the next order token of the token designated in the detection name token graph in step S350. That is, the token selection unit 230 makes an inquiry the number of nodes having a subset relationship for the next order token of the token designated in the detection name token graph. Then, the token selection unit 230 determines whether the number of subsets is less than a preset value in step S360. As a result of this determination, if the number of subsets is the preset value or more, the process returns to step S330 to designate the next order token in the order in which the plurality of tokens are sorted as an token to be analyzed, and repeat steps S330 to S360. On the other hand, as a result of the determination in step S360, if the number of subsets is less than the preset value, the token designated as the token to be analyzed is selected as the representative detection name token in step S370.

As described above, according to an embodiment of the present invention, a word that can better represent the sample group than a general or specific detection name may be selected as the representative detection name token by identifying the subset relationship between tokens. In addition, the present invention may detect tokens that are used throughout between vaccines, thus to find a word that is widely used as the representative detection name token. Further, it is possible to derive a token that is more frequently used between samples, thus to select a word that represents a more malicious code group as the representative detection name token.

Meanwhile, the above-described method according to the embodiment of the present invention may be implemented in a program command form which may be performed through various means for processing information to be recorded in a storage medium. Herein, the storage medium may include program commands, data files, data structures, and the like alone or in combination thereof. The program command recorded in the storage medium may be specially designed and configured for the present invention, or may be publicly known to and used by those skilled in the software field. Examples of the storage medium include magnetic media such as a hard disk, a floppy disk, and a magnetic tape, optical media such as a CD-ROM and a DVD, magneto-optical media such as a floptical disk, and a hardware apparatus which is specifically configured to store and examples of the program command such as a ROM, a RAM, a flash memory and the like. An example of the program command includes a high-level language code executable by an apparatus electrically processing information, for example, a computer by using an interpreter, and the like, as well as a machine language code generated by a compiler. The hardware apparatus may be configured to be operated with one or more software modules in order to perform the operation of the present invention, and an opposite situation thereof is available.

While the present invention has been described with reference to several preferred embodiments, the present invention is not limited to the above-described exemplary embodiments, and it will be understood by those skilled in the art that various modifications and variations may be made within the detailed description of the invention and accompanying drawings without departing from the scope of the present invention as defined by the appended claims, as well as these modifications and variations should be included in the scope of the present invention according to doctrine of equivalents.

DESCRIPTION OF REFERENCE NUMERALS

10: Token selection apparatus
20: Vaccine server
100: Token graph generation unit
110: Detection name collection unit
120: Detection name tokenization unit
130: Graph generation unit
140: Graph reduction unit
200: Representative token selection unit
210: Detection name input unit
220: Detection name preprocessing unit
230: Token selection unit

What is claimed is:

1. An apparatus for selecting a representative token, comprising:
 a token graph generation processor;
 a representative token selection processor; and
 a memory with instructions executable by the token graph generation and representative token selection processor,
 the token graph generation processor configured to extract a plurality of tokens from a plurality of different detection names for a malicious file and generate a detection name token graph representing a relationship between the extracted plurality of tokens; and
 the representative token selection processor configured to select a representative detection name token for the malicious file based on the detection name token graph,
 wherein the representative token selection processor is further configured:
 to receive the plurality of different detection names for the malicious file from a plurality of vaccine servers;
 to extract the plurality of tokens by tokenizing each of the plurality of different detection names for the malicious file, and
 to calculate a common index which represents a frequency in which a token is used in common in a plurality of vaccine engines, and an importance index which represents an importance of the token among the extracted plurality of tokens,
 to select at least one index of the common index and the importance index as a reference and sort the extracted plurality of tokens in the order of the highest index selected as the reference, to designate the extracted plurality of tokens to be analyzed one by one in the sorted order, and if the number of subsets for a next token to a designated token to be analyzed in the order is less than a predetermined value, to select the designated token as the representative detection name token with reference to the relationship between the plurality of tokens from the detection name token graph.

2. The apparatus for selecting the representative token according to claim 1, wherein the token graph generation processor is configured:

to collect the plurality of different detection names from the plurality of different vaccine engines for the malicious file;

to tokenize each of the plurality of different detection names to generate the plurality of tokens; and to generate the detection name token graph based on the plurality of tokens divided by tokenization.

3. The apparatus for selecting the representative token according to claim 2, wherein the detection name token graph includes nodes and connects the nodes with edges which represent relationship therebetween as a conditional probability, wherein the nodes signify the respective plurality of tokens.

4. The apparatus for selecting the representative token according to claim 3, the token graph generation processor is configured to derive the relationship between the nodes according to the conditional probability, and when the relationship between the derived nodes has weak or no relationship, delete an edge between the nodes which have the weak or no relationship to generate the detection name token graph.

5. The apparatus for selecting the representative token according to claim 2, wherein the common index is calculated based on an attribute of the respective node of the detection name token graph.

6. A method for selecting a representative token, using an apparatus having a token graph generation processor, a representative token selection processor, and a memory with instructions executable by the token graph generation and representative token selection processor, the method comprising:

extracting, by the token graph generation processor, a plurality of tokens from a plurality of different detection names for a malicious file, and generating a detection name token graph representing a relationship between the extracted plurality of tokens; and selecting, by the representative token selection processor, a representative detection name token for the malicious file based on the detection name token graph;

wherein the step of selecting the representative detection name token further comprises:

receiving the plurality of different detection names for the malicious file from a plurality of vaccine servers;

extracting the plurality of tokens by tokenizing each of the plurality of different detection names for the malicious file;

calculating a common index which represents a frequency in which a token is used in common in the plurality of vaccine servers, and an importance index which represents an importance of the token among the extracted plurality of tokens;

selecting at least one index of the common index and the importance index as a reference and sorting the extracted plurality of tokens in the order of the highest index selected as the reference;

designating the extracted plurality of tokens to be analyzed one by one in the sorted order; and making an inquiry of the number of nodes having a subset relationship for a next token to a designated token in the order in the detection name token graph, and if the number of inquired nodes having the subset relationship is less than a predetermined value, selecting the designated token as the representative detection name token.

7. The method for selecting the representative token according to claim 6, wherein the step of generating the detection name token graph comprises:

collecting the plurality of different detection names from the plurality of different vaccine engines for the malicious file;

tokenizing each of the plurality of detection names to generate the plurality of tokens; and generating the detection name token graph based on the plurality of tokens divided by tokenization.

8. The method for selecting the representative token according to claim 7, wherein the detection name token graph comprises nodes and connects the nodes with edges which represent relationship therebetween as a conditional probability, and wherein the nodes signify the respective plurality of tokens.

9. The method for selecting the representative token according to claim 8, after the step of generating the detection name token graph, further comprising:

deriving a relationship between the nodes according to the conditional probability; and when the relationship between the derived nodes has weak or no relationship, deleting an edge between the nodes which have weak or no relationship to generate the detection name token graph.

10. A non-transitory computer readable recording medium in which a program for performing a method for selecting a representative token using an apparatus having a token graph generation processor, a representative token selection processor, and a memory with instructions executable by the token graph generation and representative token selection processor on a computer is recorded, the method comprising:

extracting, by the token graph generation processor, a plurality of tokens from a plurality of different detection names for a malicious file, and generating a detection name token graph representing a relationship between the extracted plurality of tokens; and selecting, by the representative token selection processor, a representative detection name token for the malicious file based on the detection name token graph, wherein the step of selecting the representative detection name token further comprises:

receiving the plurality of different detection names for the malicious file from a plurality of vaccine servers;

extracting the plurality of tokens by tokenizing each of the plurality of different detection names for the malicious file;

calculating a common index which represents a frequency in which a token is used in common in the plurality of vaccine servers, and an importance index which represents an importance of the token among the extracted plurality of tokens;

selecting at least one index of the common index and the importance index as a reference and sorting the extracted plurality of tokens in the order of the highest index selected as the reference;

designating the extracted plurality of tokens to be analyzed one by one in the sorted order; and making an inquiry of the number of nodes having a subset relationship for a next token to a designated token in the order in the detection name token graph, and if the number of inquired nodes having the subset relationship is less than a predetermined value, selecting the designated token as the representative detection name token.

* * * * *